United States Patent
Neuschotz

[15] 3,667,526
[45] *June 6, 1972

[54] FASTENERS HAVING LOCKING KEYS

[72] Inventor: Robert Neuschotz, 1162 Angelo Drive, Beverly Hills, Calif. 90210

[*] Notice: The portion of the term of this patent subsequent to Mar. 21, 1989, has been disclaimed.

[22] Filed: Mar. 17, 1970

[21] Appl. No.: 20,294

Related U.S. Application Data

[62] Division of Ser. No. 798,659, Feb. 12, 1969, Pat. No. 3,537,118.

[52] U.S. Cl. ............................................................. 151/23
[51] Int. Cl. ........................................................ F16b 39/06
[58] Field of Search ............... 151/8, 23, 41.72, 41.73, 41.74; 85/8.1, 21, 23, 72, 76, 79; 29/432, 432.1, 432.2, 505, 525, 526; 10/72, 86, 10; 287/189.36 H, 20.3, 52.05, 53 TK, 53 LK

[56] References Cited

UNITED STATES PATENTS

| | | | |
|---|---|---|---|
| 1,457,008 | 5/1923 | Smith | 85/19 |
| 1,488,948 | 4/1924 | Smith | 85/21 |
| 1,673,430 | 6/1928 | Voight | 85/21 |
| 1,891,895 | 12/1932 | Nagel | 85/19 |
| 2,855,970 | 10/1958 | Neuschotz | 151/23 |
| 3,270,792 | 9/1966 | Neuschotz et al. | 151/23 |
| 3,319,688 | 5/1967 | Rosan et al. | 151/23 |
| 3,472,302 | 10/1969 | Rosan et al. | 151/23 |

FOREIGN PATENTS OR APPLICATIONS

| | | | |
|---|---|---|---|
| 1,286,760 | 1/1962 | France | 85/19 |

Primary Examiner—Marion Parsons, Jr.
Attorney—William P. Green

[57] ABSTRACT

A fastener having a thread with a groove extending through and interrupting the thread, and a locking key retained in the groove and adapted to be driven axially to lock the fastener in a carrier part, with the groove being deformed by the key, upon initial installation thereof in the groove, to a slightly undercut cross-section confining and retaining the key in the groove.

14 Claims, 17 Drawing Figures

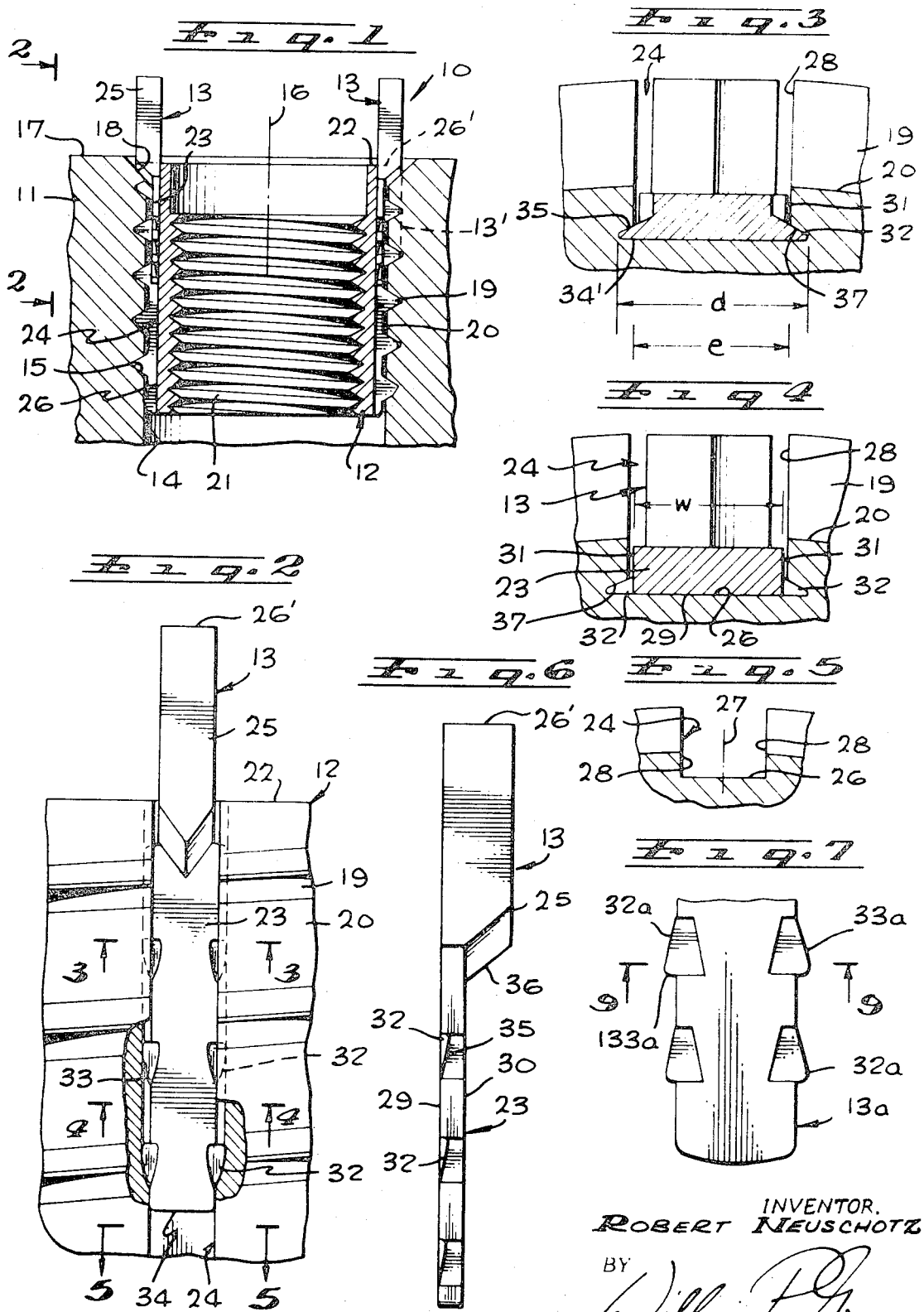

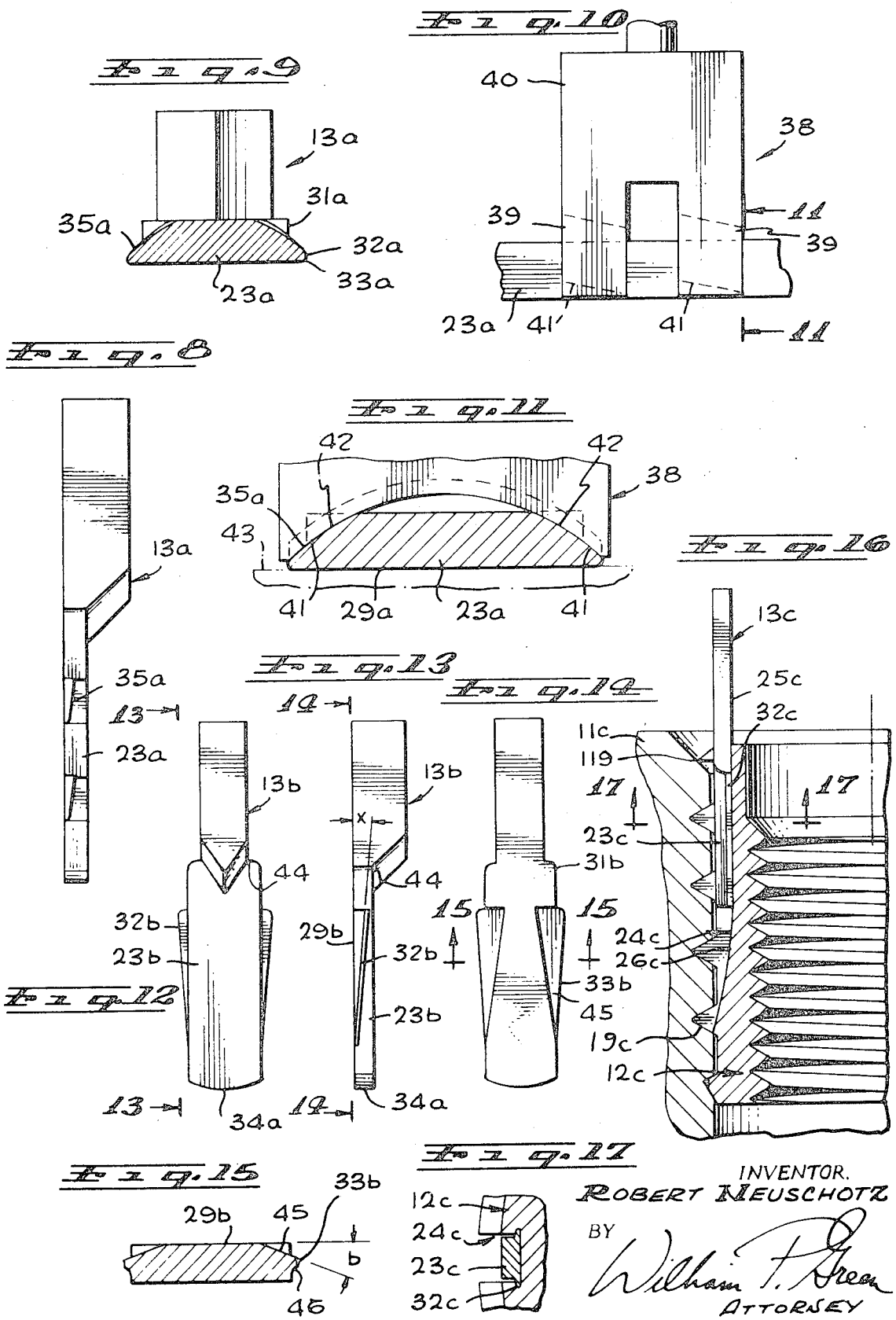

FASTENERS HAVING LOCKING KEYS

CROSS REFERENCES TO RELATED APPLICATIONS

This application is a division of my co-pending application Ser. No. 798,659 filed Feb. 12, 1969 on "Formation And Use Of Fasteners Having Keys" now U.S. Pat. No. 3,537,118. Certain features of the present disclosure are shown and claimed in my copending application Ser. No. 798,686 filed Feb. 12, 1969 on "Structural And Use Of Fasteners Having Locking Keys".

BACKGROUND OF THE INVENTION

This invention relates to fasteners of a type having a thread adapted to be connected to a coacting part, and including a locking key for securing the thread against detachment from the other part.

In my U.S. Pat. No. 2,855,970, issued Oct. 14, 1958 on "Insert Having Frictionally Retained Key Which Upsets Threads Of Base Member", I have disclosed a type of fastener having a locking key which projects into a groove in the fastener body, and which is driveable axially relative to the fastener body, at the time of connection of the fastener to a coacting part, to lock these parts against detachment. The key in that prior arrangement is retained within the groove by forming the latter to an undercut or dovetail cross-section, which effectively confines the key against movement radially out of the groove. That cross-section also guides the key during its subsequent generally axial displacement to the ultimate locking position.

In the manufacture of fasteners of the type shown in my above discussed prior patent, one difficult and relatively expensive step in the process of manufacture has been the step of shaping the key retaining groove to its desired undercut cross-section. For most sizes of fasteners, it is impossible or impractical to mill the groove by a single cutter to such an undercut section, and as a result it has normally been necessary to first mill the groove to a non-undercut shape, and then utilize a small and very fragile broaching tool, inserted axially into the groove, to undercut the side walls of the groove to the ultimate desired shape. These broaching tools require frequent sharpening, and may break during the broaching operation, or may relatively rapidly wear to a condition in which they are unable to give to the groove a sufficiently precise dovetail dimension to assure proper frictional retention of the key in the groove.

SUMMARY OF THE INVENTION

The present invention provides a unique fastener of the above discussed general type, utilizing a key retained and driveable within a groove, which may be manufactured without the necessity for shaping the groove to an undercut cross-section prior to insertion of the key within the groove, and at the same time in a manner attaining an extremely effective and positive frictional retention of the key within the groove. The groove may be formed very simply and rapidly by a single milling cutter, with much less expense and difficulty than has been encountered in the past.

The requirement for preshaping of the groove to dovetail configuration is avoided by utilizing a key which will function, when initially driven generally axially into the non-undercut groove, to itself cut or deform the engaged portion of the groove from non-undercut to undercut shape. Axially inwardly beyond the deformed portion of the groove, the groove may remain of non-undercut or at least less undercut cross-section during threaded connection of the fastener to a coacting member, and until the key is ultimately driven axially within the groove to a locking position, at which time an additional portion of the groove may be deformed to undercut shape by the key, all in a manner attaining very tight confinement of the key within the groove both during installation and in the final locking condition.

Preferably, the key has edges at two opposite sides thereof both of which serve to form shallow elongated guideway recesses in two opposite side walls of the groove, as the key is driven axially into the groove, so that these recesses give to each of the walls the desired undercut shape, and effectively confine the key against displacement radially from the groove. The edges are for best results shaped to have a camming configuration, so that as the key is driven axially the edges tend to cam or urge the key radially more deeply into the groove, to thus always assure proper positioning of the key in the groove.

BRIEF DESCRIPTION OF THE DRAWINGS

The above and other features and objects of the invention will be better understood from the following detailed description of the typical embodiments illustrated in the accompanying drawings, in which:

FIG. 1 is an axial section through a threaded insert formed in accordance with the present invention, and shown positioned within a carrier part;

FIG. 2 is an enlarged fragmentary view taken on line 2—2 of FIG. 1, but showing only the insert and not the carrier part;

FIGS. 3, 4 and 5 are fragmentary cross-sections taken on lines 3—3, 4—4 and 5—5 respectively of FIG. 2;

FIG. 6 is a side view of the key only;

FIG. 7 is a fragmentary representation of the mounting portion of a variational type of key embodying the invention;

FIG. 8 is a side view of the FIG. 7 key;

FIG. 9 is a section taken on line 9—9 of FIG. 7;

FIG. 10 is a side view of a forging die being utilized for forming the fins on the FIG. 7 key;

FIG. 11 is a section taken on line 11—11 of FIG. 10;

FIG. 12 is a front view of another variational type of key;

FIG. 13 is a side view of the key of FIG. 12, taken on line 13—13 of FIG. 12;

FIG. 14 is a bottom view of the key, taken on line 14—14 of FIG. 13;

FIG. 15 is a cross-section taken on line 15—15 of FIG. 14;

FIG. 16 is a fragmentary essentially axial section through another form of the invention; and FIG. 17 is a section taken on line 17—17 of FIG. 16.

DESCRIPTION OF THE PREFERRED EMBODIMENTS

Describing first the form of the invention shown in FIGS. 1–6, and with reference particularly to FIG. 1, I have shown at 10 a fastener typically taking the form of an internally and externally threaded insert, with the fastener being shown positioned within a carrier part 11. The fastener includes a rigid threaded body 12, preferably formed of an appropriate metal such as steel, and one or more (typically two) locking keys 13 for locking the fastener body against removal from the carrier part. The carrier part may be formed of an appropriate rigid material, such as aluminum, a resinous plastic material, or the like, and contains a passage 14 having an internal thread 15 centered about an axis 16. The axially outer surface 17 of the carrier part may be planar and disposed transversely of axis 16, with a tapering frusto-conical countersink surface 18 being provided at the axially outer end (upper end) of thread 15.

Fastener body 12 has an external thread 19 dimensioned in correspondence with and adapted to be screwed into internal thread 15 of the carrier part. Both of these threads may be of completely standard configuration except for the provision of modified minor diameter surfaces 20 having a diameter and an axial extent which are greater than they would be if the threads were entirely standard.

Internally, fastener body 12 has a second thread 21, which may be standard in form, and into which a coacting threaded screw or stud may be connected, to secure the screw or stud to the carrier part through the medium of fastener body 12. The axially outer end of body 12 may have a substantially annular end surface 22 which is desirably planar and disposed transversely of axis 16, and which in the installed FIG. 1 position of the insert body is located substantially flush with, or preferably slightly under a flush position with respect to, the planar outer surface 17 of the carrier part.

Each of the locking keys 13 of the fastener 10 is frictionally held in the FIG. 1 outwardly projecting position with respect to fastener body 12 prior to and during installation of the fastener within the carrier part. Each key has an axially inner mounting portion 23 which is relatively thin in a direction radially of axis 16, and which is received and held within a mounting groove 24 extending axially along the outer surface of body 12. Axially outwardly beyond mounting portion 23, each key has a radially thicker locking portion 25, which projects axially beyond outer end surface 22 of the insert body 12, and has an end surface 26' adapted to be engaged by a hammer or other driving tool to drive the key axially inwardly to the broken line locking position 13' of the righthand key in FIG. 1. In this locking position, the outer end surface 26' of the key is desirably substantially flush with outer end surface 22 of the insert.

Prior to installation of the keys within grooves 24, each groove may be formed to the non-undercut cross-section illustrated in FIG. 5. More particularly, the groove may have a rectangular cross-section transversely of axis 16, being defined at its radially inner side by an inner planar wall surface 26 extending parallel to axis 16 and perpendicular to a radial line 27 from that axis. The opposite sides of groove 24 may be defined by two parallel planar opposite side wall surfaces 28, both lying parallel to axis 16, and parallel to and spaced equal distances from radial line 27, and perpendicular to inner wall 26 of the groove. In the form of the invention shown in FIGS. 1-6, the above discussed cross-section of each groove is initially uniform and unchanging through the entire length of the groove. The inner wall surface 26 of the groove is located radially inwardly beyond the minor diameter of internal thread 15 in the carrier part, and in most instances also inwardly of the minor diameter of insert thread 19, to provide a space within which the thin mounting portion 23 of key 13 can be received without contacting or interfering with thread 15 as the insert is screwed into the carrier part. The groove is illustrated as continuing through the entire length of the insert, but may of course extend through only a portion of that length if desired.

Portion 23 of the key has a planar surface 29 at its radially inner side slidably engageable with inner wall surface 26 of groove 24, and has a radially outer surface 30 which may also be planar and disposed parallel to surface 29 at approximately the location of minor diameter surfaces 20 of thread 19. At its opposite sides, portion 23 of each of the keys is defined by two parallel axially extending opposite side surfaces 31, disposed perpendicular to surfaces 29 and 30, and preferably spaced apart a width dimension $w$ slightly less than the width of the groove between its opposite side walls 28. Projecting laterally from the opposite sides of mounting portion 23, each key has one or more pairs of fins 32, typically three pairs as seen in FIG. 2, which fins act upon installation of the key within groove 24 to deform the groove to the undercut cross-section of FIG. 3. These fins may be formed by locally upsetting or forging the metal forming the key 13 at the location of each of the fins, to give the fin the shape illustrated in FIGS. 2-6. More particularly, as seen in FIGS. 2, 3 and 6, each fin has an outer lateral edge 33 (see especially FIG. 2) which projects a short distance laterally beyond the plane of side wall surfaces 31 of portion 23, and which advances progressively laterally inwardly toward the inner end 34 of the key. As seen in cross-section in FIG. 3, the fins may have planar undersurfaces 34' forming continuations of the previously mentioned surface 29, and may have radially outer surfaces 35 which converge downwardly toward undersurface 29-24 in advancing laterally. As indicated in the side view of FIG. 6, surfaces 35 also desirably converge toward the plane of surface 29 as surfaces 35 advance axially inwardly toward the inner end 34 of the key.

In most instances the overall width $d$ of the key at the location of each pair of fins (FIG. 3) is only a few thousandths of an inch (preferably between about 0.006 and 0.012 of an inch) greater than the width dimension $e$ between the opposite side wall surfaces 28 of the groove, and preferably between about 0.008 and 0.014 of an inch greater than the width dimension $w$ between the side surfaces 31 of portion 23 of the key. The difference between the dimensions $e$ and $w$ should also preferably be not greater than a few thousandths of an inch, desirably between about 0.001 and 0.004 of an inch.

The relatively thick axially outer locking portion 25 of each key projects radially outwardly far enough to cut through and deform the internal thread 15 of the carrier part when the key is driven axially from the full line position of FIG. 1 to the broken line position of the righthand key in that figure. At its axially inner end, portion 25 has a shoulder 36 which cuts through the material of the carrier part, and which during initial installation engages countersink surface 18 in a manner limiting the extent to which the fastener assembly can be screwed into the carrier part, and therefore accurately predetermining the slightly underflush setting of outer surface 22 of the insert relative to surface 17 of the carrier part.

As previously indicated, the insert body 12 is first formed with its grooves 24 having the FIG. 4 non-undercut cross-section along the entire length of the insert. After the body 12 has been formed to this condition, and prior to installation of body 12 within a carrier part, each of the keys 13 is driven axially into the corresponding groove 24 to the position illustrated in FIG. 2, and illustrated in full lines in FIG. 1. During such advancement of the keys into the grooves, fins 32 deform or cut through the material of body 12 at the base of each of the side walls 28 of the groove, to form axially extending elongated guideway recesses 37 (FIGS. 3 and 4) at the base of those side walls, and thereby give side walls 28 an undercut cross-section as seen clearly in FIG. 3. The fins 32 are tightly frictionally confined within the undercut guideway recesses 37 in a manner tightly frictionally holding each key 13 in the full line position of FIG. 1 relative to body 12, and by virtue of the undercut arrangement retaining the keys against radially outward displacement from the grooves. Axially inwardly beyond the leading pair of fins 32 of each key, the groove 24 of course retains its original FIG. 5 non-undercut cross-section. It is also noted that, by virtue of the camming angularity of outer surfaces 35 of the fins, as seen in the side view FIG. 6, these surfaces tend to cam or urge the key radially inwardly tightly against inner surface 26 of the groove, to assure proper positioning of the key within the radially inner portion of the groove.

After the keys 13 have been installed within body 12 to the FIG. 1 position, the fastener body 12 and keys can be handled as a single essentially integral unit, with the outwardly projecting keys being utilized for assisting in screwing the body 12 into carrier part 11. The assembly is advanced into the carrier part until engagement of the keys with countersink surface 18 halts such advancement, following which the keys are driven axially inwardly until their outer ends 26 are flush with surface 22 of the body 12. During this final driven movement of the keys within grooves 24, fins 32 act to form axially inner extensions or continuations of the guideway recesses 37 of FIGS. 3 and 4, and act to continue camming the keys radially inwardly against surface 26 to maintain proper positioning of the keys within the grooves.

FIGS. 7-9 illustrate a variational form of key 13a which may be substituted for the keys 13 of FIG. 1, and which can be identical with key 13 except as to a slight change in the configuration of the laterally projecting fins 32a, corresponding to fins 32 of FIGS. 1-6. In FIGS. 7-9, the outer or lateral edges 33a of the fins may at their leading ends be rounded or curved, as indicated at 133a in FIG. 7, to facilitate advancement of the fins into the material of the carrier part, and to assure proper formation of guideway recesses corresponding to recesses 37 of FIGS. 3 and 4. Axially outwardly beyond their rounded leading ends, edges 33a may converge gradually and progressively toward the planes of side wall surfaces 31a of the key, as seen clearly in FIG. 7.

In forming the key of FIGS. 7-9, its thin portion 23a may first be shaped to have a uniform rectangular cross-section along its entire length, with planar surfaces 31a continuing without interruption even through the locations at which the fins are ultimately formed. This uniform cross-section portion 23a of the key may then be upset, to form one or more pairs of fins 32a, by a forging tool such as that illustrated at 38 in FIGS. 10 and 11. If two pairs of fins are to be provided, as shown, this forging tool may include two identical rigid forging dies 39 secured together by a suitable rigid connector structure 40, and each having an arcuate forging undersurface 41 (FIG. 11) which strikes downwardly against portion 23a of the key to deform it at two opposite side locations 42 in a manner forming two opposed fins. During this forging operation, the portion 23a of the key may rest on and be supported by a rigid anvil or backing surface 43, acting to maintain or produce whatever configuration is desired at the underside of the key (a completely planar undersurface configuration in the key of FIGS. 7-9). The forging surfaces 41 of the two elements 39 are given appropriate angularities to cause radially outer surfaces 35a of the fins (FIG. 9) to have a camming angularity similar to that described in connection with surfaces 35 of FIG. 6, and for the same purpose. That is, surfaces 35a advance progressively away from the plane of undersurface 29a of the key as they advance axially outwardly (upwardly in FIG. 8). The use of the key of FIGS. 7-11 is of course the same as has been discussed in connection with the first form of key illustrated in FIGS. 1-6, and need not be reiterated.

FIGS. 12-15 show another form of locking key 13b which may be substituted for the key 13 or 13a of the other forms of the invention. This key 13b may be considered as substantially identical with key 13, except for a difference in the configuration of the laterally projecting fins 32b. More specifically, there may typically be only two fins in FIGS. 12-15, and these fins may be formed by first giving the thin portion 23b of the key a uniform rectangular cross-section along its entire length, from the inner end portion 34a to the location 44 of FIG. 12, and then upsetting or forging portion 23b near its opposite side edges from the under or inner side of the key (left side in FIG. 13), to cause the fins to project laterally outwardly a few thousandths of an inch. The forged surfaces 45 and the opposite surfaces 46 on each of the fins 32b may both advance at a camming angularity corresponding to that of surface 35 in FIG. 6, and for the same purpose, (camming angle x in FIG. 13) to tend to cam the key radially inwardly against the inner wall surface 26 of groove 24 in FIGS. 3 and 4, both during initial partial installation of the key within the groove, and subsequent advancement of the key to its ultimate locking position. As in the first form of the invention, the lateral edges 33b of the fins 32b in FIGS. 12-15 converge progressively toward one another and toward the parallel planes of the main portions of side wall surfaces 31b as edges 33b advance toward the axially inner end 34a of the key, to thus facilitate deformation of the side walls of the groove in the fastener body to their desired undercut configuration, for tightly confining and retaining the keys in their partially installed positions within the grooves.

With reference to the cross-sectional view FIG. 15, it is preferred that the upset surfaces 45 of the key be planar, and desirably that the angle b in FIG. 15 representing the angularity in a transverse plane between surfaces 45 and undersurface 29b of the key be between about 10 and 30 degrees.

FIG. 16 is a fragmentary axial section, similar to FIG. 1, through a final form of insert embodying the invention, and also embodying the invention of my co-pending application Ser. No. 798,686. In FIG. 16, the axially outwardly projecting portion 25c of the key 13c is no thicker than the axially inner mounting portion 23c which is received and frictionally retained within groove 24c in body 12c. To attain a locking action without the necessity for the thickened axially outer portion of the key, the groove and particularly its radially inner wall surface 26c are shaped to curve gradually radially outwardly as they advance axially inwardly, so that in the FIG. 16 position the key will not interfere with screwing of the insert into carrier part 11c, and yet when driven axially inwardly the key will be deflected or directed slightly radially outwardly toward the material of the carrier part, to cut through and deform the threads of the carrier part and lock the insert against removal. Other similar arrangements for directing a key radially as it advances axially, to attain a locking action without the necessity for a thickened outer portion of the key, are shown in my above mentioned application Ser. No. 798,686 and may be used in conjunction with the features of the present invention.

In FIG. 16, the fins 32c are typically illustrated as not having the camming angularity of the previously illustrated forms of the invention. Instead, fins 32c are relatively long, desirably extending along essentially the entire axial length of the mounting portion 23c of the key, and may be of completely uniform and unchanging transverse cross-section (typically the cross-section of FIG. 17) through the entire length of the fins. When this finned portion of the key is driven into the initially non-undercut groove 24c, fins 32c cut or form undercut guideways in the side walls of the groove, to retain the key frictionally in the FIG. 16 position in the groove. During such installation of the key in the groove, the key may be engaged by a suitable locating tool, and be held by that tool inwardly against the inner wall 26c of the groove.

For determining the extent to which the insert of FIG. 16 may be screwed into the carrier, the external thread 19c of body 12c may have its axially outer turn 119 deformed axially inwardly as illustrated, to form a stop shoulder acting to limit advancement of the insert into the carrier part at the FIG. 16 slightly underflush position.

While I have typically described certain specific embodiments of my invention, it is of course to be understood that the invention is not limited to these particular forms, but rather is applicable broadly to numerous variations falling within the scope of the appended claims.

I claim:

1. A fastener comprising a body having a thread to be engaged with a coacting part, said body containing a generally axially extending groove and a locking key received and retained partly within said groove and adapted to be driven generally axially and to lock said thread of the fastener against detachment from said coacting part when so driven, said groove having a portion of undercut cross-section receiving said key in tightly confined relation and retaining the key against radial separation from the groove by virtue of said undercut cross-section, and said groove having a portion axially inwardly beyond said undercut portion which is of non-undercut cross-section.

2. A fastener as recited in claim 1, in which said key has two opposite side edge portions which are received and frictionally retained in fixed positions within shallow recesses formed in opposite side walls of said undercut portion of the groove, said side walls continuing but said recesses therein being discontinued axially beyond said edge portions of the key to define said non-undercut portion of the groove.

3. A fastener as recited in claim 2, in which said opposite side edge portions of the key have a camming angularity tending to cam the key radially more deeply into the groove upon axial displacement of the key.

4. A fastener as recited in claim 1, in which said key has an edge of camming configuration tending to cam the key radially more deeply into the groove upon axial displacement of the key.

5. A fastener as recited in claim 1, in which said groove extends generally axially through at least a portion of, and interrupts, said thread.

6. A fastener as recited in claim 1, in which said key has a thin axially inner mounting portion received in said groove and a thicker axially outer locking portion projecting axially outwardly beyond said groove and exposed for engagement by a tool in driving the key axially to locking position.

7. A fastener as recited in claim 1, in which said key has fins at opposite sides thereof upset to be thinner than adjacent portions of the key and to project laterally beyond said adjacent portions into interfitting retained relation with side walls of the groove at said portion of undercut cross-section.

8. A fastener as recited in claim 7, in which said fins narrow progressively as they advance axially inwardly.

9. A fastener as recited in claim 7, in which said fins have camming surfaces which advance progressively more deeply into said groove as they advance axially inwardly.

10. A fastener as recited in claim 1, in which said thread is external, said groove extending generally axially through at least a portion of said external thread, said body having an additional thread to be connected to another element in order to connect said element to said coacting part through the medium of said fastener, said key having fins at opposite sides thereof upset to be thinner than adjacent portions of the key and to project laterally beyond said adjacent portions into interfitting retained relation with said walls of the groove at said portion of undercut cross-section and to extend said undercut portion when the key is driven generally axially inwardly to locking position, said fins narrowing progressively as they advance axially inwardly, and having camming surfaces which advance progressively radially inwardly as they advance axially inwardly, said camming surfaces advancing progressively more deeply into the groove as they advance laterally outwardly, said key having an axially inner mounting portion received in said groove and carrying said fins and a thicker axially outer locking portion projecting beyond said groove and exposed for engagement by a tool in driving the key axially to locking position.

11. A fastener comprising a body having a thread to be engaged with a coacting part, said body containing a generally axially extending groove, and a locking key received and retained partly within said groove and adapted to be driven generally axially and to lock said thread of the fastener against detachment from said coacting part when so driven, said key having two edge portions at its opposite sides engaging and retained by opposite side walls of said groove, at least one of said edge portions having a camming angularity with respect to the engaged wall of said groove tending to cam the key radially more deeply into the groove upon axial displacement of the key.

12. A fastener as recited in claim 11, in which both of said edges have said camming angularity.

13. A fastener as recited in claim 11, in which said groove extends generally axially through at least a portion of, and interrupts, said thread, said key having a thin axially inner mounting portion received in said groove and having said edges at its opposite sides with both edges having said camming angularity, said key having a thicker axially outer locking portion projecting axially outwardly beyond the groove and accessible for engagement by a driving tool.

14. A fastener as recited in claim 13, in which said edges of said mounting portion form fins at opposite sides thereof which taper to reduced thicknesses as they advance laterally outwardly and to reduced widths as they advance axially inwardly, and which have outer camming surfaces advancing progressively radially inwardly as they advance axially inwardly.

* * * * *